(12) United States Patent
Bourget et al.

(10) Patent No.: US 8,894,337 B2
(45) Date of Patent: Nov. 25, 2014

(54) FASTENER WITH DISPLAY RECEPTACLE

(71) Applicant: Custom Metal Crafters, Inc., Newington, CT (US)

(72) Inventors: Daniel Bourget, Southington, CT (US); Romeo Carrier, East Hartford, CT (US)

(73) Assignee: Custom Metal Crafters, Inc., Newington, CT (US)

( * ) Notice: Subject to any disclaimer, the term of this patent is extended or adjusted under 35 U.S.C. 154(b) by 50 days.

(21) Appl. No.: 13/662,662

(22) Filed: Oct. 29, 2012

(65) Prior Publication Data

US 2013/0108395 A1     May 2, 2013

Related U.S. Application Data

(60) Provisional application No. 61/552,524, filed on Oct. 28, 2011.

(51) Int. Cl.
    *F16B 37/14*      (2006.01)

(52) U.S. Cl.
    USPC .......................................... 411/373; 411/375

(58) Field of Classification Search
    USPC ........... 411/375, 373, 396, 374, 372.5, 372.6, 411/315, 325, 1.5, 331, 323, 631, 27.5; 24/113 MP
    See application file for complete search history.

(56) References Cited

U.S. PATENT DOCUMENTS

| | | | | |
|---|---|---|---|---|
| 3,439,439 | A | * | 4/1969 | Stimson ........................... 40/1.5 |
| 5,424,137 | A | | 6/1995 | Stagl |
| 5,499,427 | A | * | 3/1996 | Bowman ......................... 16/417 |
| 5,586,853 | A | * | 12/1996 | Poe .............................. 411/373 |
| 6,752,119 | B2 | | 6/2004 | Coleman |
| 6,805,213 | B2 | | 10/2004 | Seffernick et al. |
| 7,237,683 | B1 | | 7/2007 | Hammers |
| 7,437,840 | B2 | | 10/2008 | Ratmansky et al. |
| 2010/0293826 | A1 | | 11/2010 | Mottola |

\* cited by examiner

*Primary Examiner* — Gary Estremsky
(74) *Attorney, Agent, or Firm* — Alix, Yale & Ristas, LLP

(57) ABSTRACT

The present disclosure illustrates a fastener with an arrangement on the head of the fastener for receiving a medallion, coin or other flat commemorative or decorative item. A threaded stud is secured to a cap which includes a receptacle on a rear surface, complimentary to the head of the stud, and a display pocket on a forward or outer surface for receiving the medallion or coin. The receptacle on the rear side of the cap includes an upstanding rim or lip having an inside diameter slightly larger than the outside diameter of the head of the stud. In the disclosed embodiments, the cap is secured to the stud by swaging or deforming the rim against the head of the stud to rigidly and permanently attach the cap to the stud, forming a fastener with an enlarged head.

10 Claims, 17 Drawing Sheets

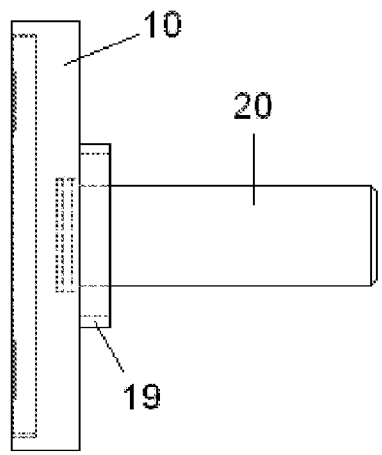
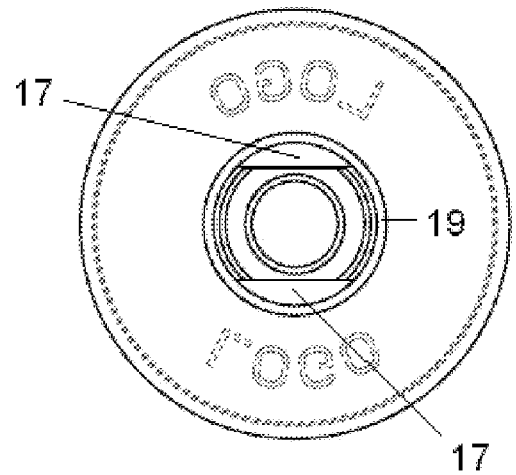
Figure 9A                Figure 9B
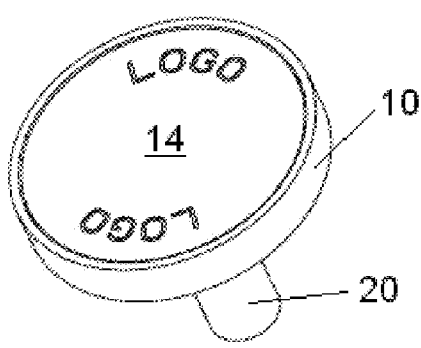
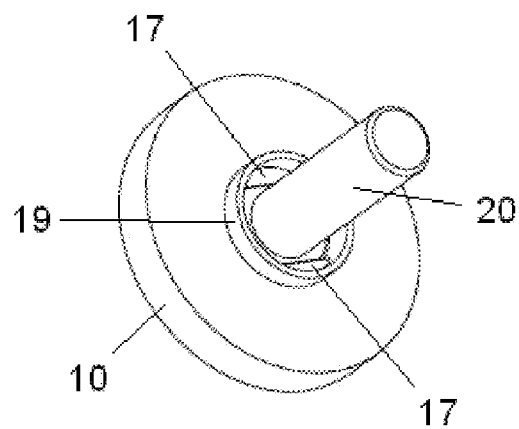
Figure 9C                Figure 9D

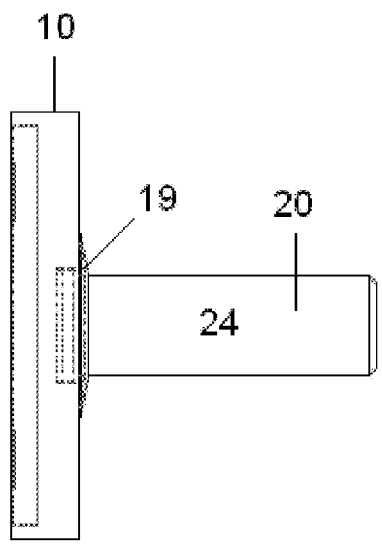
Figure 10A
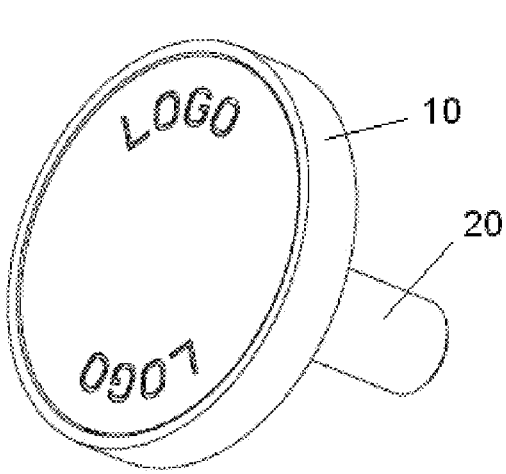 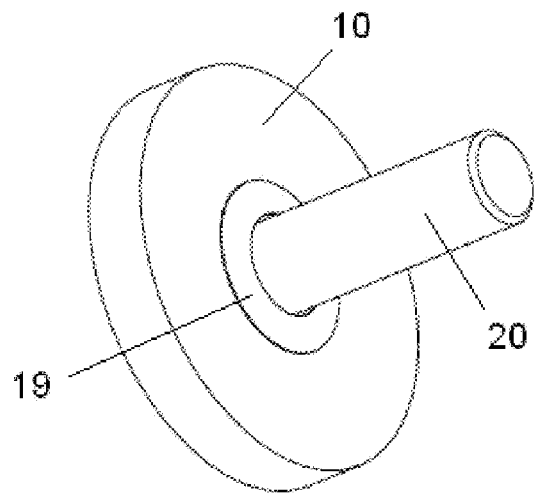
Figure 10B                    Figure 10C

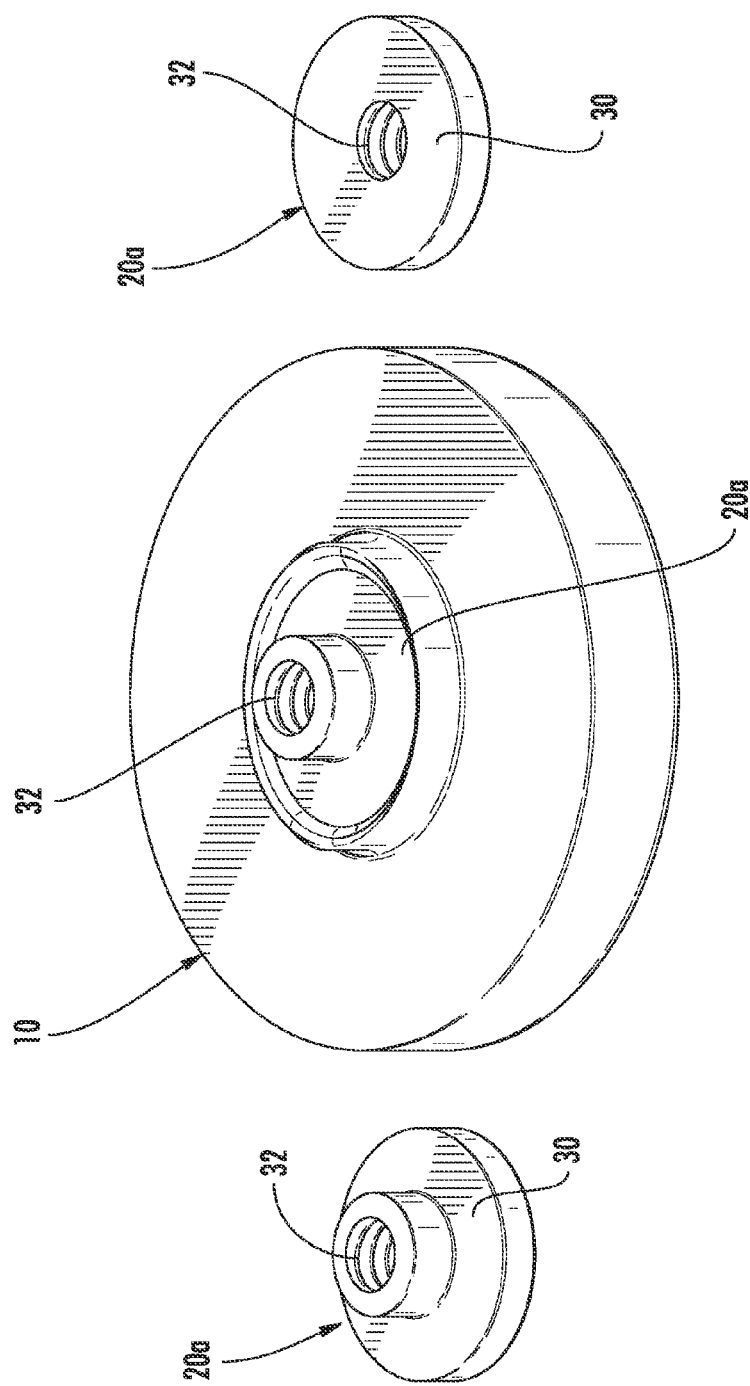

FASTENER WITH DISPLAY RECEPTACLE

BACKGROUND OF THE INVENTION

Motor vehicle operators frequently enjoy customizing their car, boat, motorcycle or other vehicle to display emblems or symbols denoting their affiliation with groups, including military service organizations and clubs. Items displayed on vehicles also include souvenir items gathered from locations where the individual has traveled. Vehicles can be customized with paint, decals, stickers, and other decorative items configured for attachment to one or more surfaces, such as bumpers, windows and the body of the vehicle. Some commemorative items do not lend themselves to such attachment and require alternative means for attachment and display on the vehicle.

Medallions and coins such as challenge coins are very popular souvenirs and display items. The physical configuration of medallions and coins can make it difficult to securely display these items on a vehicle.

SUMMARY OF THE INVENTION

The present disclosure illustrates a fastener with an arrangement on the head of the fastener for receiving a medallion, coin or other flat commemorative or decorative item. A threaded stud is configured for passage through a hole and to be secured by a nut. The head of the stud is secured to a cap which includes a receptacle on a rear surface, complimentary to the head of the stud, and a pocket on a forward or outer surface for receiving the medallion or coin. The pocket on the rear side of the cap includes an upstanding rim or lip having an inside diameter slightly larger than the outside diameter of the head of the stud. In the disclosed embodiment, the cap is secured to the stud by swaging or deforming the rim against the head of the stud, as shown in FIG. 5. This rigidly and permanently attaches the cap to the stud, forming a fastener with an enlarged head. The front or top surface of the cap includes a recess configured to receive a medallion or coin. The illustrated embodiment shows a circular pocket approximately one inch in diameter. Of course, other shapes and sizes are compatible with the disclosed invention. The pocket defined by the cap is a shallow flat-bottomed receptacle with an upright rim. The receptacle and rim are configured to closely receive a medallion or coin. The medallion or coin may be adhesively joined to the cap, or the cap rim may be deformed to mechanically engage the medallion or coin.

The stud is formed by conventional methods for manufacturing fasteners. Conventional fastener manufacturing techniques do not allow the economical creation of the complex shapes necessary for the disclosed cap. In the disclosed embodiment, the cap is cast separately by methods such as die casting. The disclosed cap is one quarter of an inch from the bottom of the rim defining the receptacle for the head of the stud to the top of the rim surrounding the cavity used to receive the medallion or coin. The outside diameter of the cap is slightly more than one inch. The dimensions of the stud and cap will vary depending upon the medallion to be received and the intended use for the finished fastener.

The disclosed fastener combination can be used, for example, to secure a license plate to the appropriate bracket on a motorcycle. When so employed, the disclosed fastener provides a conspicuous receptacle for the reception of a medallion or coin. Decorative items on motor vehicles are often placed on the rear of the vehicle where visibility is high. The disclosed fastener places medallions or coins on display on those portions of the vehicle that get the most attention. The stud may be equipped with teeth or a squared shank just beneath the head to help the fastener remain rotationally fixed with respect to the bracket and license plate during tightening of the nut around the bolt to secure the assembly.

BRIEF DESCRIPTION OF THE DRAWINGS

FIGS. 9A-9D illustrate the cap of FIGS. 7A-7D in conjunction with the stud of FIGS. 8A-8D;

FIGS. 10A-10C illustrate the stud of FIGS. 8A-8D secured to the cap of FIGS. 7A-7D and the medallion of FIGS. 1A-1C in a completed assembly;

FIG. 17 illustrates a further alternative embodiment where the stud element is internally threaded and the shank of the stud is a separate, threaded rod or screw.

DETAILED DESCRIPTION OF THE DISCLOSED EMBODIMENTS

Several embodiments of a fastener with a display receptacle are disclosed. The fastener comprises a cap configured to receive a medallion or other decorative item and a stud secured to the cap to secure the cap through a hole in a surface. The stud may be threaded and secured by a nut, but other attachment mechanisms, such as a push nut are also compatible with the disclosed embodiments. The illustrated caps are manufactured by die casting, but other manufacturing methods are compatible with the disclosed embodiments. The illustrated studs are formed using conventional mass production techniques for fasteners. Rather than forming the fastener with display receptacle as a single, unitary article, the disclosed embodiments are constructed of inexpensively mass produced caps and studs, which are then secured together to form a finished fastener with display receptacle assembly.

Figure 1A:
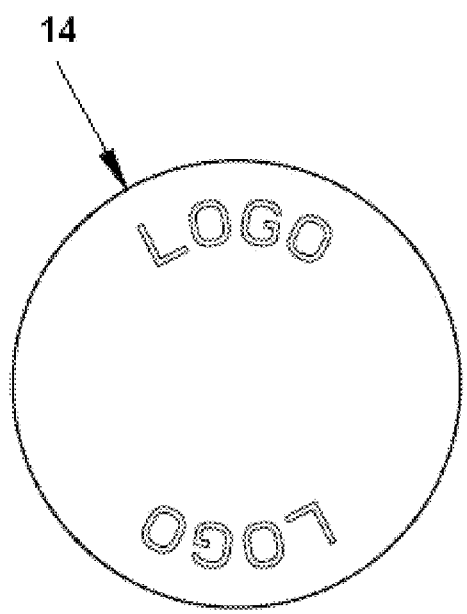
FIGS. 1A-1C illustrate an example of a prior art medallion for use in conjunction with the cap according to aspects of the disclosure.
Figure 1B:
Figure 1C:
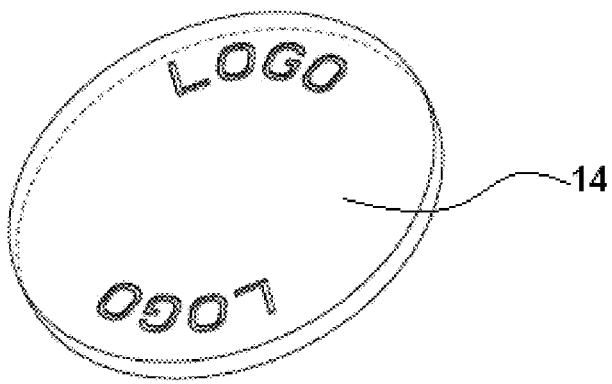
Figure 2A:
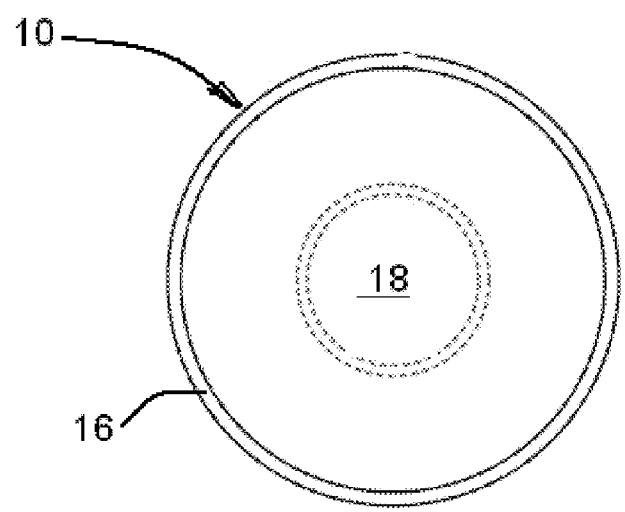
FIGS. 2A-2D illustrate a first embodiment of a cap for use in conjunction with a medallion of FIGS. 1A-1C.
Figure 2B:
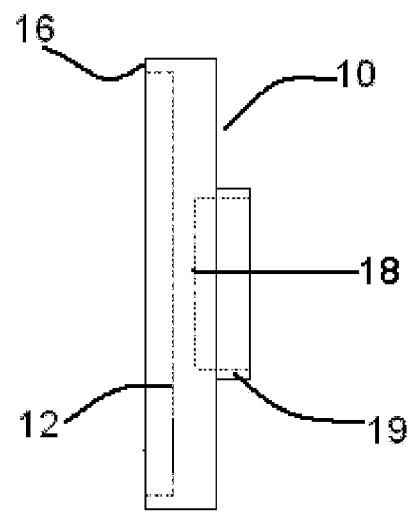
Figure 2C:
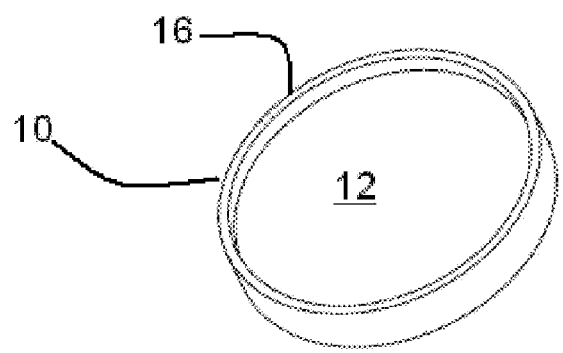
Figure 2D:
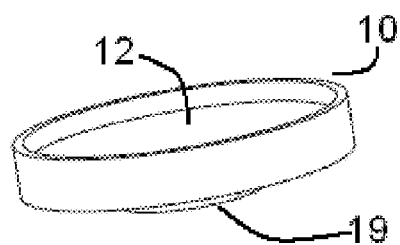
Figure 3A:
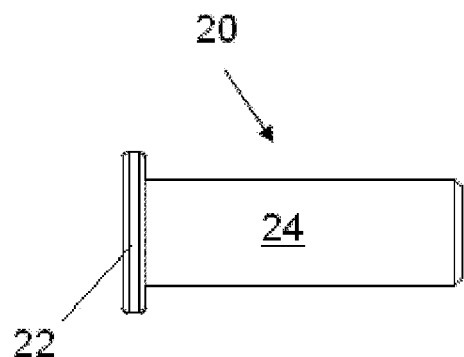
FIGS. 3A-3D illustrate a first embodiment of a stud for use in conjunction with the cap of FIGS. 2A-2D, FIGS. 4A-4D illustrate the stud of FIGS. 3A-3D in conjunction with the cap of FIGS. 2A-2D.
Figure 3B:
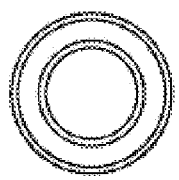
Figure 3C:
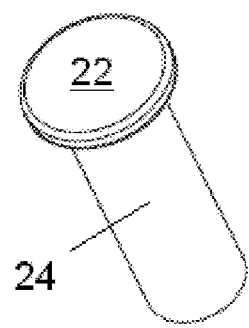
Figure 3D:
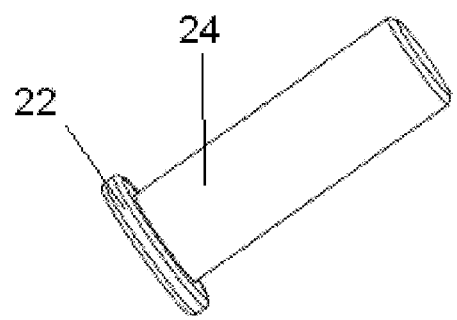
Figure 4A:
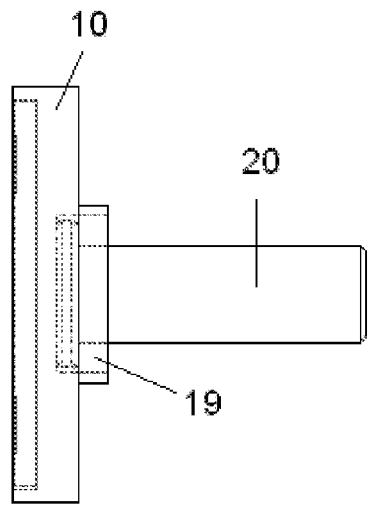
Figure 4B:
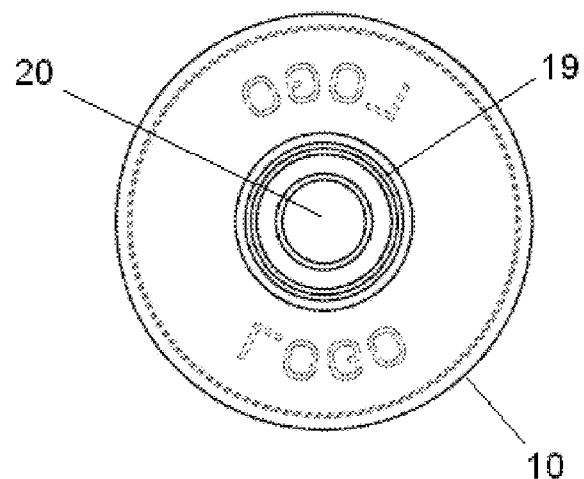
Figure 4C:
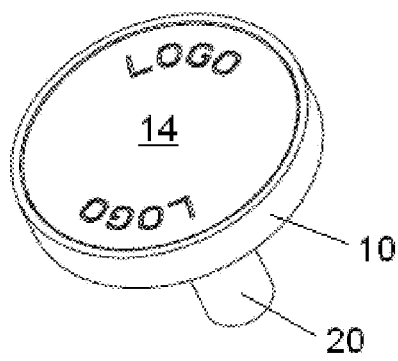
Figure 4D:
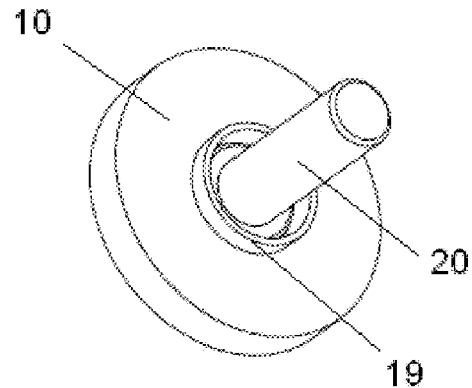
Figure 5A:
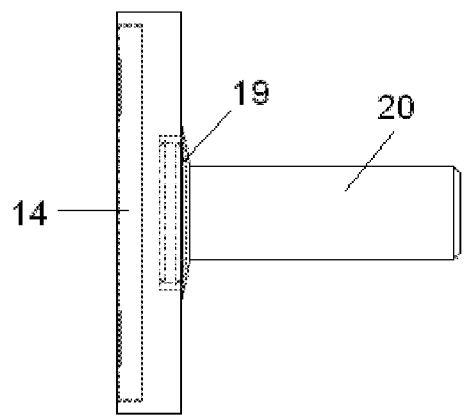
FIGS. 5A-5C illustrate the cap of Figures with the stud of FIGS. 3A-3D and medallion of FIGS. 1A-1C in a completed assembly.
Figure 5B:
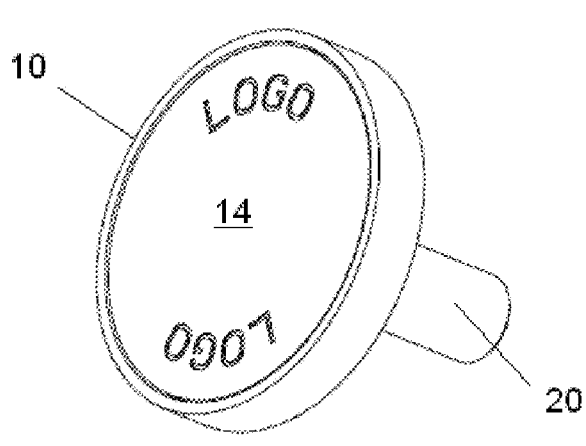
Figure 5C:
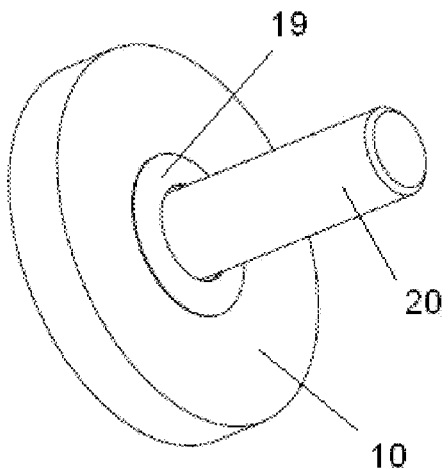
Figure 6:
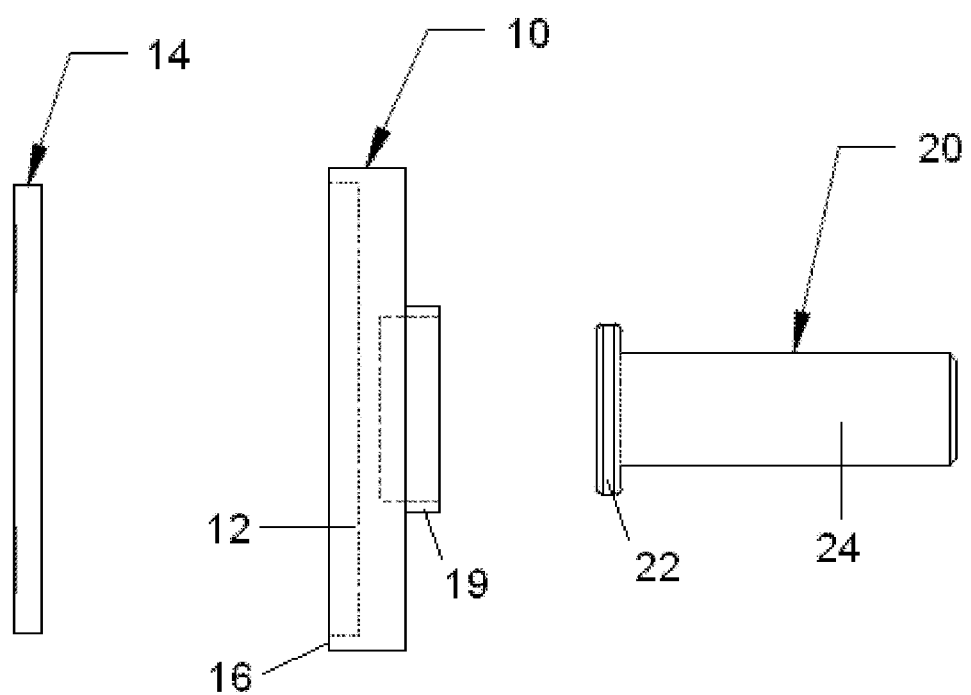
FIG. 6 is an exploded diagram of a medallion, cap and stud according to the embodiment illustrated in FIGS. 1A-5C.

FIGS. 1A-1C illustrate a prior art medallion compatible for use with the disclosed fastener with display receptacle. FIGS. 2A-6 illustrate a first embodiment of a fastener with a display receptacle. The cap 10 shown in FIGS. 2A-2D is circular and configured to receive a medallion 14 or coin in the pocket 12 defined on a forward surface of the cap 10. The pocket 12 is surrounded by an upstanding rim 16 having an inside diameter slightly larger than the outside diameter of the medallion 14. The stud 20 shown in FIGS. 3A-3D includes a plain, circular head 22 configured to be received in the receptacle 18 defined on the rear side of the cap 10. The receptacle 18 is surrounded by a lip 19 having an inside diameter slightly larger than the outside diameter of the head 22 of the stud 20. The stud 20 includes a threaded shank 24 extending from the head 22. As shown in FIGS. 4A-4D, 5A-5C and 6, the head 22 of the stud 20 is received in the receptacle 18 on the rear side of the cap 10 and the lip 19 is swaged or formed against the bottom side of the head 22 of the stud 20 to secure the stud 20 to the cap. The coin or medallion 14 is received in the pocket 12 and secured therein by adhesive or crimping the rim 16 against the outside diameter of the medallion 14. Other methods of securing a medallion to the pocket will occur to those skilled in the art and are compatible with the present disclosures.

Additional embodiments will be described with reference to FIGS. 7-17. The additional embodiments will be described where they differ from the embodiment of FIGS. 1-6 and the same reference numerals will be used to designate similar structures among the various embodiments.

Figure 7A:
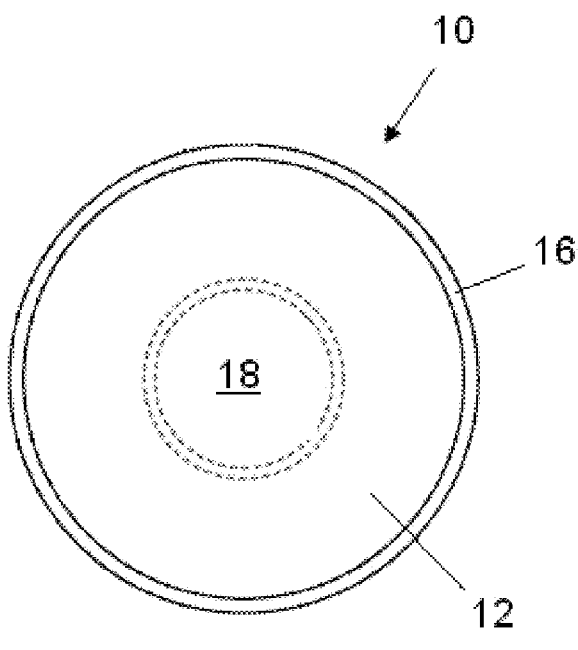
FIGS. 7A-7D illustrate a second embodiment of a cap configured to receive a medallion shown in FIGS. 1A-1C.
Figure 7B:
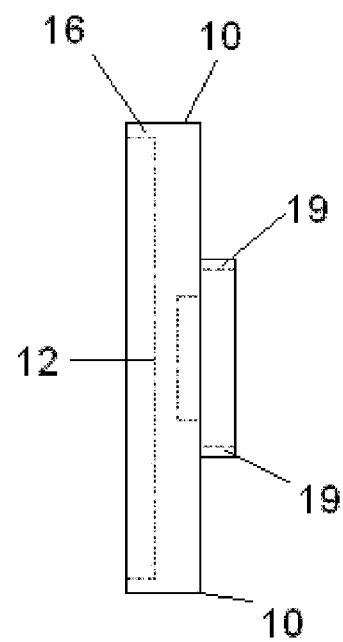
Figure 7C:
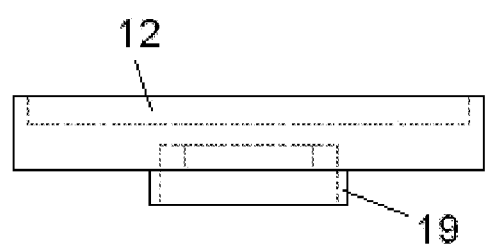
Figure 7D:
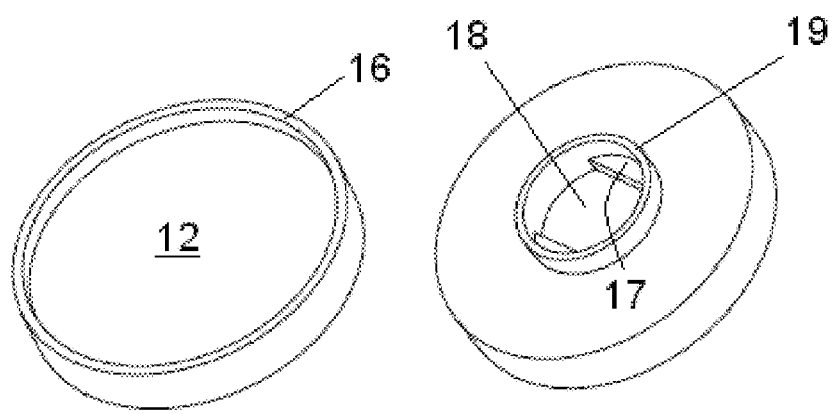
Figure 8A:
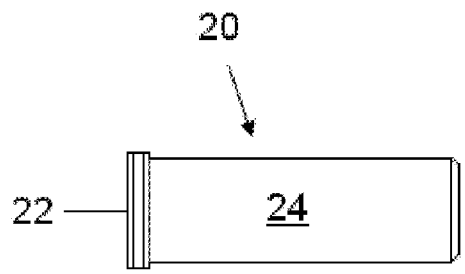
FIGS. 8A-8D illustrate a stud compatible with the cap of FIGS. 7A-7D.
Figure 8B:
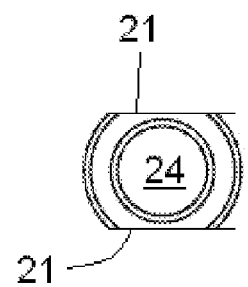
Figure 8C:
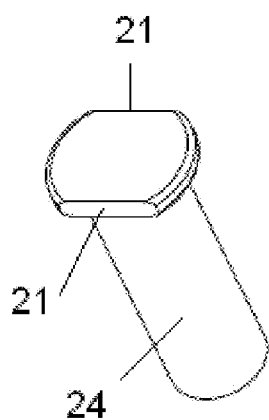
Figure 8D:
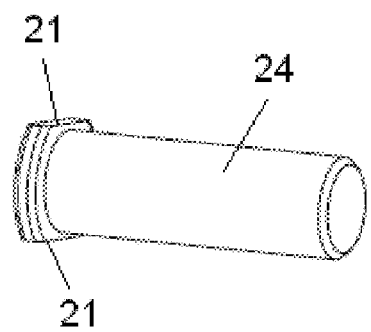
Figure 11:
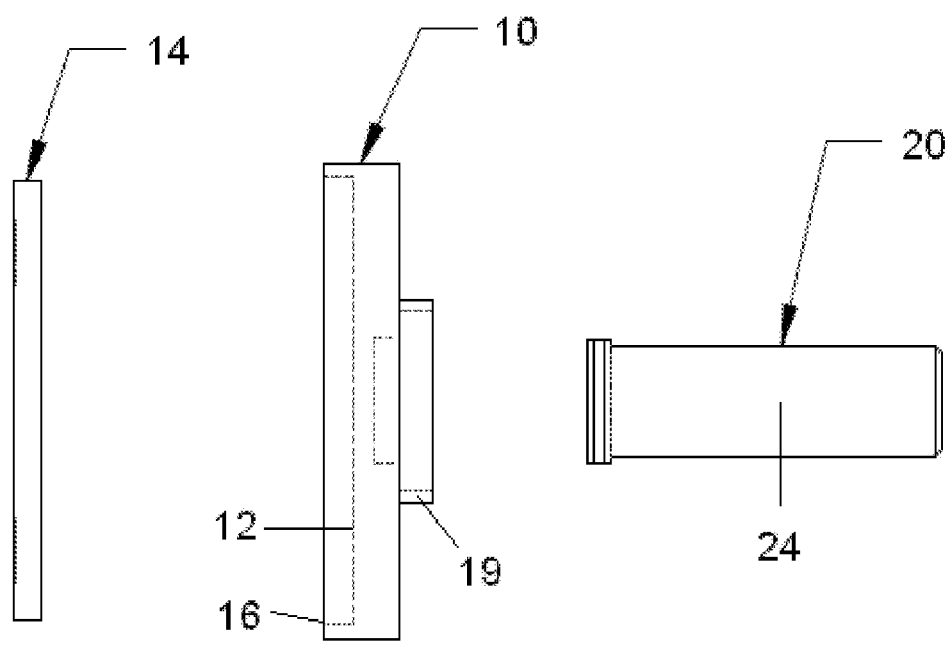
FIG. 11 is an exploded diagram of the medallion, cap and stud of FIGS. 10A-10C.
Figure 12A:
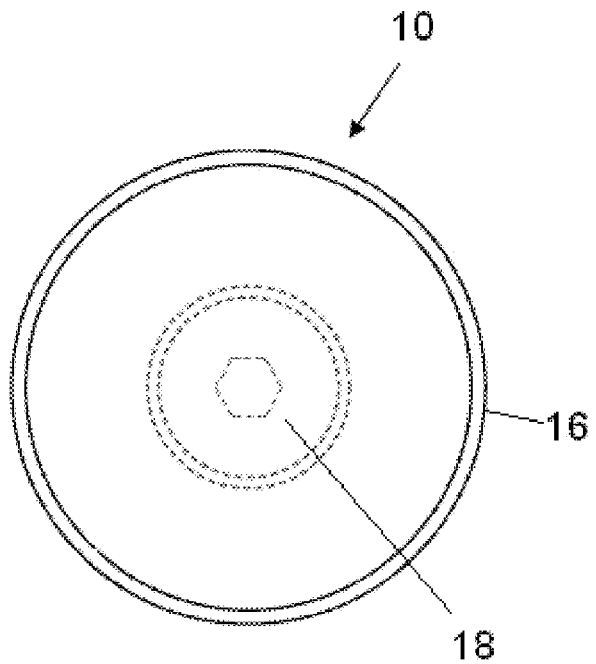
FIGS. 12A-12D illustrate a third embodiment of a cap compatible with the disclosure and configured to receive a medallion as shown in FIGS. 1A-1C.
Figure 12B:
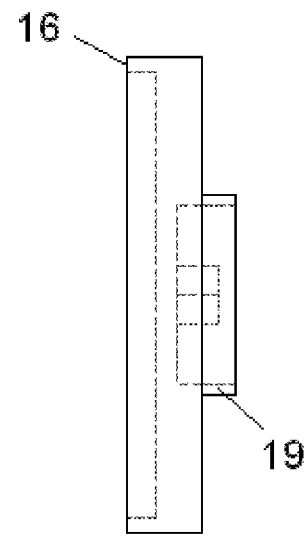
Figure 12C:
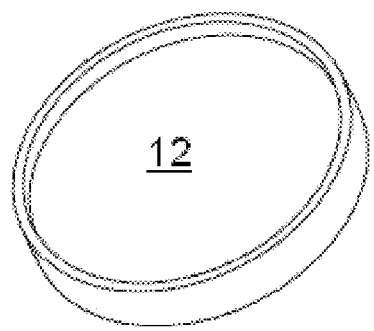
Figure 12D:
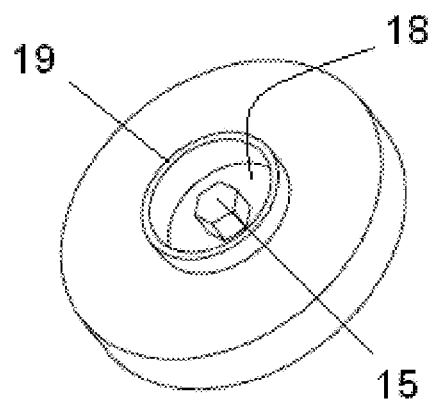
Figure 13A:
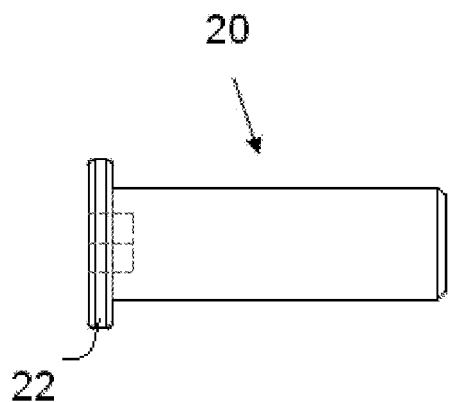
FIGS. 13A-13D illustrate a stud compatible with the cap shown in FIGS. 12A-12D.
Figure 13B:
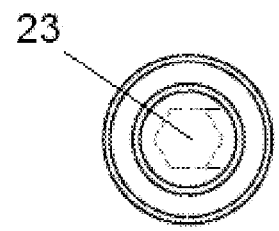
Figure 13C:
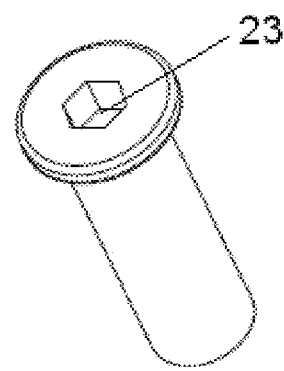
Figure 13D:
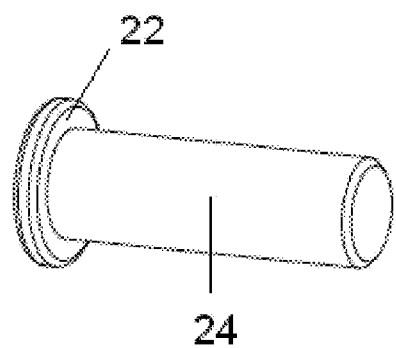
Figure 14A:
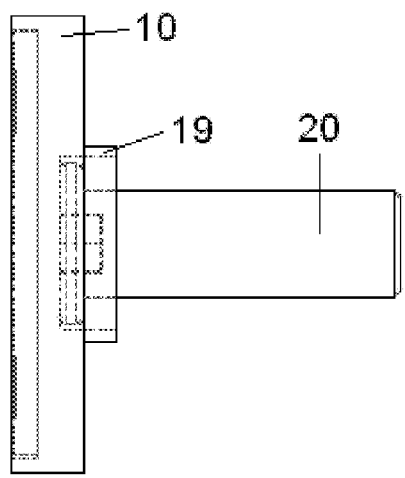
FIGS. 14A-14D illustrate the stud of FIGS. 13A-13D in functional conjunction with the cap of FIGS. 12A-12D.
Figure 14B:
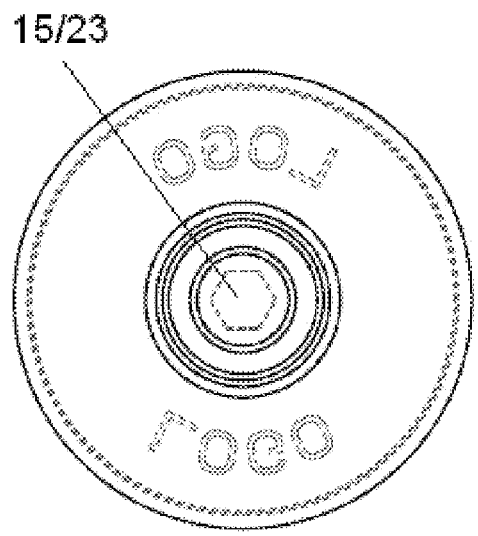
Figure 14C:
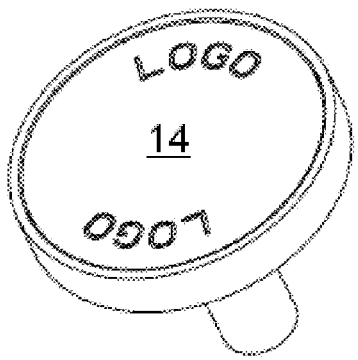
Figure 14D:
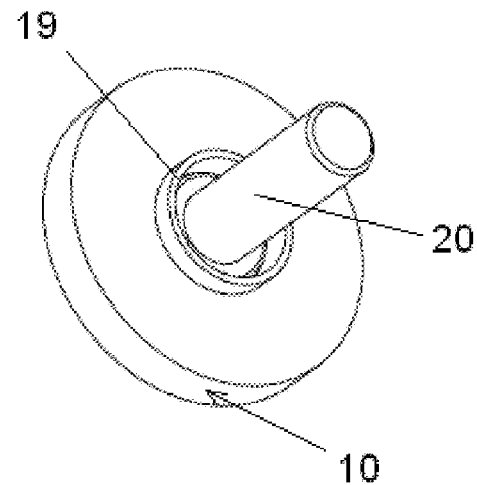
Figure 15A:
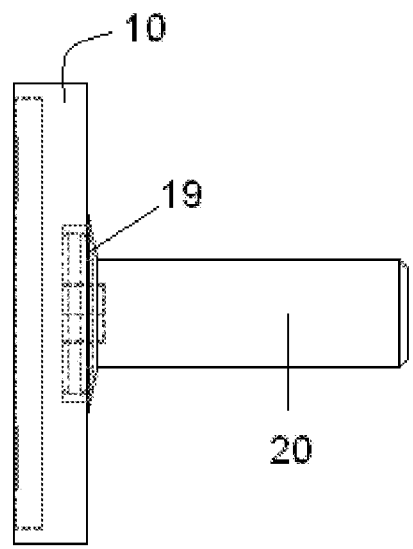
FIGS. 15A-15C illustrate the medallion of FIGS. 1A-1C, the cap of FIGS. 12A-12D and the stud of FIGS. 13A-13D in a finished assembly.
Figure 15B:
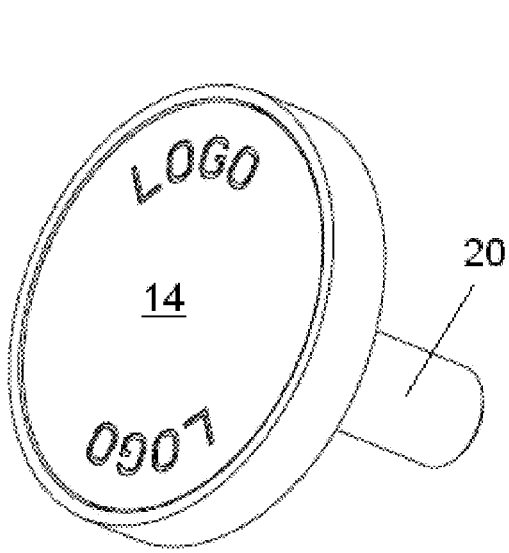
Figure 15C:
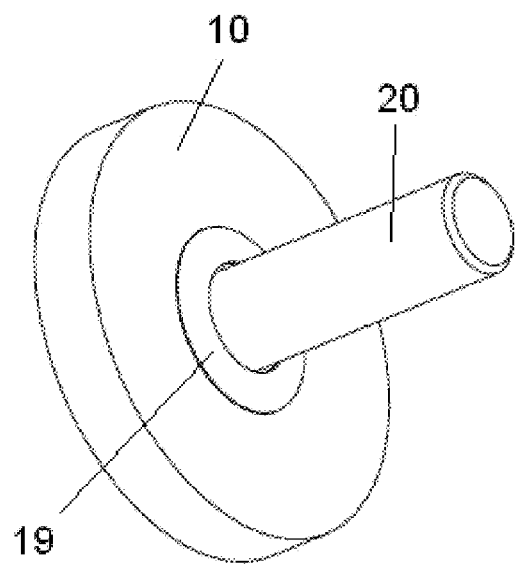
Figure 16:
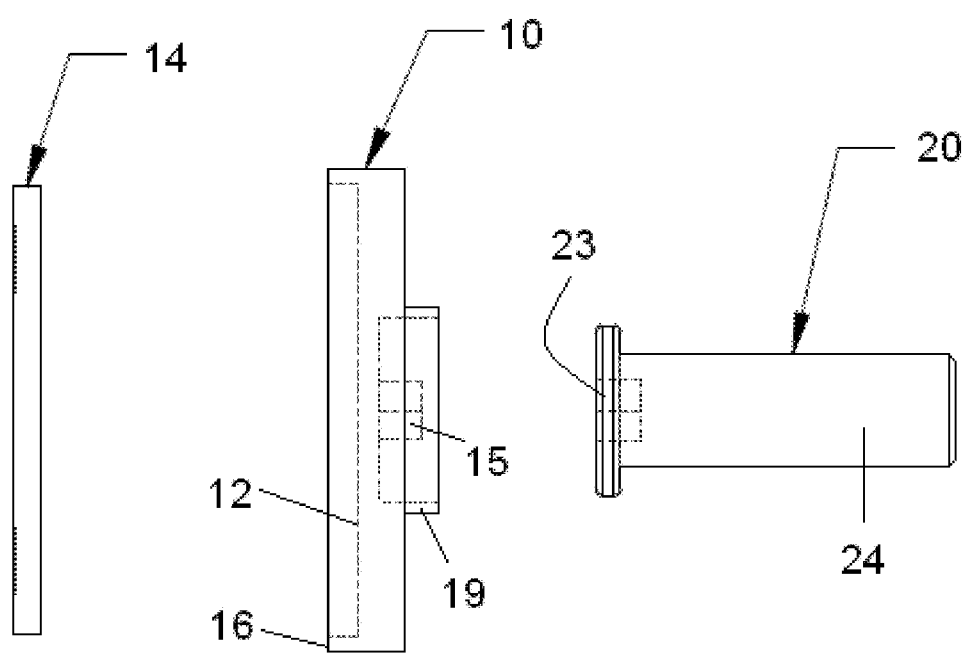
FIG. 16 is an exploded diagram of the medallion, cap and stud of FIGS. 15A-15C.

One issue that can arise with the disclosed two component fastener embodiments is that the head 22 of the stud 20 can spin inside the receptacle 18, preventing the nut (not shown) from being sufficiently tightened. FIGS. 7A-11 illustrate a second embodiment of a fastener with a display receptacle configured to address this issue. In this embodiment, the head 22 of the stud 20 is shaped with flats 21 on opposed sides. The flats 21 prevent the stud 20 from rotating with respect to the cap 10, so the assembled fastener better controls the orientation of the medallion being displayed and the stud remains stationary when a nut (not shown) is tightened on the shank 24. As shown in FIGS. 7D and 9D, the cap 10 defines a receptacle 18 with raised portions 17 arranged to abut the flats 21 on the head 22 of the stud 20. The stud 20 is attached to the cap 10 by swaging or forming the rim 19 of the receptacle 18 over the head 22 of the stud 20 as shown in FIG. 10. Other means of connecting the stud 20 and the cap 10 will occur to those skilled in the art and are compatible with the disclosed embodiments.

FIGS. 12A-16 illustrate a third embodiment of a fastener with display receptacle also configured to maintain a fixed rotational relationship between the stud 20 and the cap 10. In this embodiment, the head 22 of the stud 20 is provided with a hex shaped socket 23 best shown in FIG. 13C. The cap 10 defines a receptacle 18 including a protrusion 15 complementary to the socket 23 on the stud 20. When the stud 20 is received in the socket 18, the protrusion is received in the socket 23 and prevents rotation of the stud 20 relative to the cap 10.

FIG. 17 illustrates a further alternative embodiment of a stud 20a for use in conjunction with the disclosed cap 10. In this embodiment, the stud 20a has a head 30 with an internally threaded bore 32. This embodiment allows the cap 20a to be attached by a screw (not shown) with a compatibly threaded shank engaged with the stud 20a from the rear of the cap 10. This configuration may be suitable for attachment to leather, fabric or other flexible materials.

The disclosed embodiments illustrate various means of mechanically securing a cap to a stud to provide a fastener with display receptacle. The head of the stud may be modified to rotationally fix the stud relative to the cap.

What is claimed is:

1. A fastener with display receptacle comprising:
    a cap having a first side defining a display pocket surrounded by a rim having a first inside diameter adapted to be greater than an outside diameter of a medallion to be displayed, said cap having a second side defining a receptacle surrounded by a lip having a second inside diameter;
    wherein said rim projects axially in a direction opposite said lip;
    a stud having a shank having a first diameter and a head having a second diameter greater than said shank but less than said second inside diameter;
    wherein the head of said stud is received in said receptacle and said lip is formed over said head to retain said stud to said cap.

2. The fastener with display receptacle of claim 1, wherein said cap, display pocket, receptacle, and head are circular.

3. The fastener with display receptacle of claim 1, wherein said cap, display pocket and lip are circular, but said receptacle and head are non circular and mating said non circular head and receptacle prevent rotation of said stud relative to said cap.

4. The fastener with display receptacle of claim 1, wherein said shank is threaded.

5. The fastener with display receptacle of claim 1, wherein said receptacle includes at least one protrusion and said head defines a complementary socket, wherein said socket and protrusion are mated prior to securing the stud to the cap and said protrusion and socket prevent rotation of the cap relative to said stud.

6. The fastener with display receptacle of claim 1, wherein said pocket includes adhesive.

7. The fastener with display receptacle of claim 1, wherein said cap is die cast metal and said lip is cold formed over said cap.

8. A fastener with display receptacle comprising:
    a cap having a first side defining a display pocket surrounded by a rim having a first inside diameter adapted to be greater than an outside diameter of a medallion to be displayed, said cap having a second side defining a receptacle surrounded by a lip having a second inside diameter;
    a stud defining an internally threaded bore and a head having an outside diameter smaller than said second inside diameter;
    wherein said display pocket includes adhesive, said head is received in said receptacle and said lip is formed over said head to retain said stud to said cap.

9. The fastener with display receptacle of claim 8, wherein said cap is die cast metal and said lip is cold formed over said cap.

10. The fastener with display receptacle of claim 8, wherein said rim projects axially in a direction opposite said lip.

* * * * *